United States Patent
Hino et al.

(10) Patent No.: US 9,601,960 B2
(45) Date of Patent: Mar. 21, 2017

(54) ROTATING ELECTRICAL MACHINE WITH BIASED BOBBIN

(71) Applicants: Keiji Hino, Tokyo (JP); Kazuhisa Takashima, Tokyo (JP); Atsushi Ichigozaki, Tokyo (JP); Katsuhiko Sakamoto, Tokyo (JP)

(72) Inventors: Keiji Hino, Tokyo (JP); Kazuhisa Takashima, Tokyo (JP); Atsushi Ichigozaki, Tokyo (JP); Katsuhiko Sakamoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 203 days.

(21) Appl. No.: 14/388,391

(22) PCT Filed: Sep. 27, 2012

(86) PCT No.: PCT/JP2012/074911
§ 371 (c)(1),
(2) Date: Sep. 26, 2014

(87) PCT Pub. No.: WO2013/179504
PCT Pub. Date: Dec. 5, 2013

(65) Prior Publication Data
US 2015/0048711 A1   Feb. 19, 2015

(30) Foreign Application Priority Data

May 29, 2012   (JP) .................. 2012-122078

(51) Int. Cl.
*H02K 3/34*   (2006.01)
*H02K 3/32*   (2006.01)
*H02K 3/52*   (2006.01)

(52) U.S. Cl.
CPC ........... *H02K 3/345* (2013.01); *H02K 3/325* (2013.01); *H02K 3/522* (2013.01); *H02K 2203/12* (2013.01)

(58) Field of Classification Search
CPC ........... H02K 3/32; H02K 3/34; H02K 3/345
(Continued)

(56) References Cited

U.S. PATENT DOCUMENTS

| 7,126,246 B2 * | 10/2006 | Izumi | ............... H02K 3/522 |
| | | | 310/180 |
| 8,450,898 B2 * | 5/2013 | Sears | ............... H02K 3/522 |
| | | | 310/194 |

(Continued)

FOREIGN PATENT DOCUMENTS

| JP | 51-26443 A | 2/1976 |
| JP | 63-299747 A | 12/1988 |

(Continued)

OTHER PUBLICATIONS

International Search Report for PCT/JP2012/074911, dated Dec. 18, 2012.

(Continued)

*Primary Examiner* — John K Kim
(74) *Attorney, Agent, or Firm* — Sughrue Mion, PLLC; Richard C. Turner

(57) ABSTRACT

An electrical machine includes a back-yoke engagement portion including a convex portion for a back yoke portion formed on an outer-diameter surface of a pair of back yoke-side coil retaining pieces and a shoe engagement portion including a convex portion for a shoe portion. By the convex portion for the back yoke portion and the convex portion for the shoe portion, the back yoke-side coil retaining pieces and shoe-side coil retaining pieces are biased toward a stator core.

8 Claims, 7 Drawing Sheets

(58) Field of Classification Search
USPC .................................... 310/43, 71, 156, 215
See application file for complete search history.

(56) References Cited

U.S. PATENT DOCUMENTS

| | | | | |
|---|---|---|---|---|
| 8,575,815 | B2* | 11/2013 | Jang ...................... | H02K 1/148 |
| | | | | 310/216.001 |
| 8,853,913 | B2* | 10/2014 | Tang ...................... | H02K 3/345 |
| | | | | 310/215 |
| 8,917,006 | B2* | 12/2014 | Jang ...................... | H02K 3/522 |
| | | | | 310/214 |
| 2004/0245882 | A1 | 12/2004 | Horie et al. | |
| 2007/0145838 | A1* | 6/2007 | Uchitani ................ | H02K 3/522 |
| | | | | 310/68 B |
| 2010/0264774 | A1* | 10/2010 | Tokunaga .............. | H02K 3/522 |
| | | | | 310/215 |
| 2015/0048711 | A1* | 2/2015 | Hino ...................... | H02K 3/325 |
| | | | | 310/215 |

FOREIGN PATENT DOCUMENTS

| | | |
|---|---|---|
| JP | 2009-201314 A | 9/2009 |
| JP | 2012-016133 A | 1/2012 |
| WO | 2005101612 A1 | 10/2005 |

OTHER PUBLICATIONS

Written Opinion for PCT/JP2012/074911, dated Dec. 18, 2012.
Communication dated Apr. 11, 2016, from the European Patent Office in counterpart European Application No. 12877689.5.

* cited by examiner

ROTATING ELECTRICAL MACHINE WITH BIASED BOBBIN

CROSS REFERENCE TO RELATED APPLICATIONS

This application is a National Stage of International Application No. PCT/JP2012/074911, filed Sep. 27, 2012, claiming priority from Japanese Patent Application No. 2012-122078, filed May 29, 2012, the contents of all of which are incorporated herein by reference in their entirety.

TECHNICAL FIELD

The present invention relates to a rotating electrical machine including a stator, to which coils formed by winding a conductor wire around a stator core via insulating bobbins therebetween are mounted.

BACKGROUND ART

An electrical motor, which is a rotating electrical machine, includes a stator provided on an outer circumference of a rotatable rotor. The stator includes coils mounted to a stator core via insulating bobbins therebetween.

As the insulating bobbin, there is known an insulating bobbin including a first insulating bobbin portion and a second bobbin portion, which are inserted from both end-surface sides of the stator core along an axial direction (see Patent Literature 1, for example).

CITATION LIST

Patent Literature

[PTL 1] JP 2012-16133 A

SUMMARY OF INVENTION

Technical Problem

However, there is a problem in that the first insulating bobbin portion and the second insulating bobbin portion come off the stator core under vibrations or their own weights during a step of mounting the coil to the stator core after the insertion onto the stator core.

The present invention has been made to solve the problem described above, and has an object to provide a rotating electrical machine that prevents an insulating bobbin from coming off a stator core under vibrations or its own weight after the insertion onto the stator core.

Solution to Problem

According to one embodiment of the present invention, there is provided a rotating electrical machine, including:
a rotor rotatable about a shaft; and
a stator provided so as to surround the rotor, the stator including a stator core and a coil mounted to the stator core by winding a conductor wire around the stator core through an insulating bobbin therebetween, the stator core including:
a back yoke portion having a ring-like shape;
a plurality of tooth portions provided at intervals in a circumferential direction so that distal end portions of the plurality of tooth portions project from the back yoke portion in an axial core direction; and
shoe portions provided at the distal end portions of the plurality of tooth portions to project in the circumferential direction, in which:
the insulating bobbin includes a first insulating bobbin portion and a second insulating bobbin portion inserted onto both end surfaces of the stator core in an axial direction, respectively;
each of the first insulating bobbin portion and the second insulating bobbin portion includes:
a back yoke engagement portion having an L-like sectional shape, the back yoke engagement portion being configured to be brought into engagement with the back yoke portion;
a shoe engagement portion to be brought into engagement with each of the shoe portions; and
a coil winding portion having a U-like sectional shape, around which the conductor wire is to be wound, the coil winding portion having an opening portion on an inner side thereof, into which each of the plurality of tooth portions is to be inserted;
the back yoke engagement portion includes a convex portion for the back yoke portion, which is configured to be brought into contact with an inner-diameter surface of the back yoke portion, the convex portion being formed on at least one of outer-diameter surfaces of a pair of back yoke-side coil retaining pieces opposed to the inner-diameter surface of the back yoke portion;
the shoe engagement portion includes a convex portion for the each of the shoe portions, which is configured to be brought into contact with an outer-diameter surface of the each of the shoe portions, the convex portion being formed on at least one of inner-diameter surfaces of a pair of shoe-side coil retaining pieces opposed to the outer-diameter surface of the each of the shoe portions; and
the pair of back yoke-side coil retaining pieces and the pair of shoe-side coil retaining pieces are biased toward the stator core by the convex portion for the back yoke portion and the convex portion for the each of the shoe portions.

Advantageous Effects of Invention

According to the rotating electrical machine according to one embodiment of the present invention, by the convex portion for the back yoke portion and the convex portion for the shoe portion, which are formed on the each of the first insulating bobbin portion and the second insulating bobbin portion, the back yoke-side coil retaining pieces and the shoe-side coil retaining pieces are biased toward the stator core. As a result, the insulating bobbin can be prevented from coming off the stator core under vibrations or its own weight.

DESCRIPTION OF EMBODIMENT

First Embodiment

Figure 1:
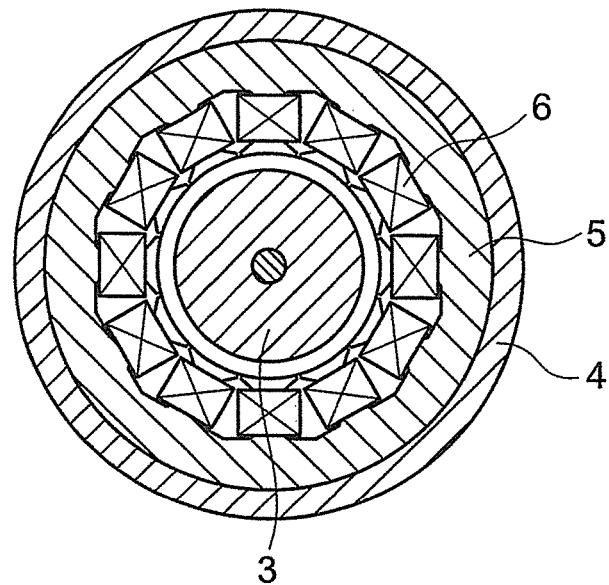
FIG. 1 is a front sectional view illustrating an electrical motor 1 according to the first embodiment of the present invention.

Now, an electrical motor according to a first embodiment of the present invention is described referring to the drawings.

Figure 2:
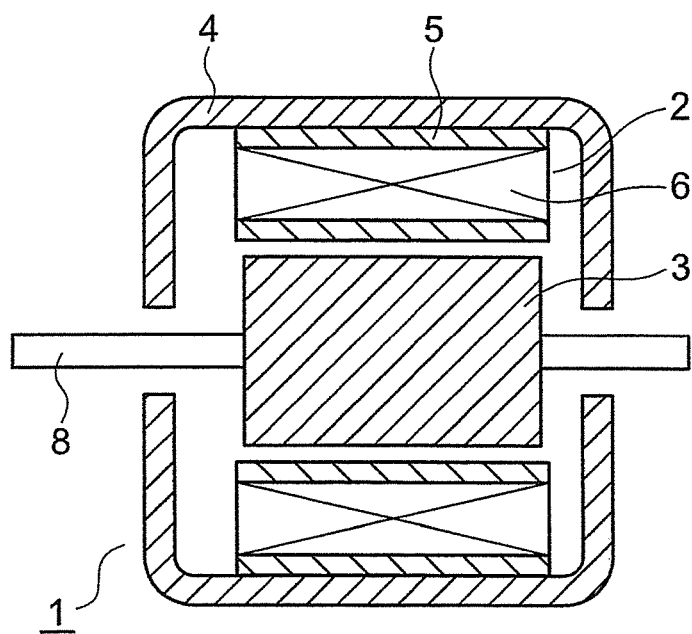
FIG. 2 is a sectional side view in FIG. 1.

FIG. 1 is a front sectional view illustrating an electrical motor 1 according to the first embodiment of the present invention, and FIG. 2 is a sectional side view in FIG. 1.

The electrical motor 1, which is a rotating electrical machine, is used for an electrical power steering device, and includes a frame 4 having a cylindrical shape, a rotor 3 provided inside the frame 4, which is rotatable about a shaft 8, and a stator 2 fixed to an inner wall surface of the frame 4, which surrounds the rotor 3.

The stator 2 includes a stator core 5 having a cylindrical shape, which includes slots extending in an axial direction thereof, and coils 6 formed by winding copper wires being conductor wires in the slots of the stator core 5 via insulating bobbins therebetween.

The rotor 3 starts rotating with the start of a flow of a current through the coils 6 to excite the stator 2.

Figure 3:
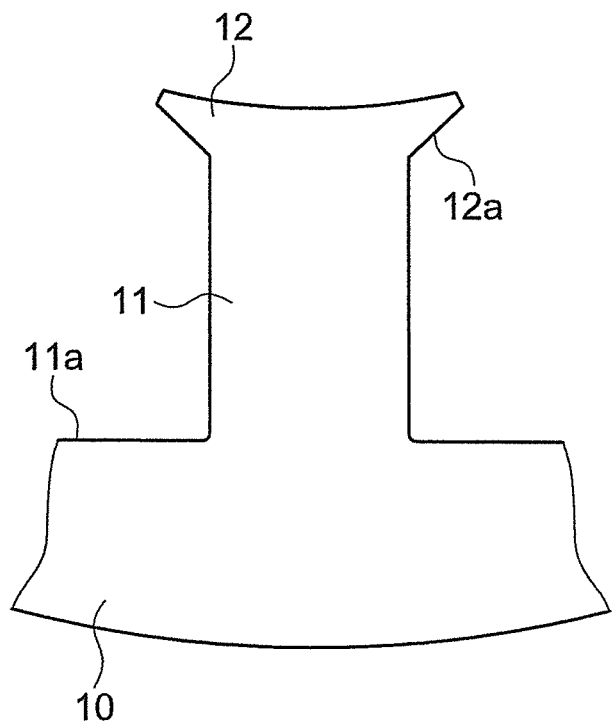
FIG. 3 is a plan view of a principal part of a stator core illustrated in FIG. 1.

As illustrated in FIG. 3, the stator core 5 includes a back yoke portion 10 having a ring-like shape, a plurality of tooth portions 11 provided equiangularly so that distal end portions thereof project from the back yoke portion 10 in an axial-core direction, and shoe portions 12 provided at the distal end portions of the tooth portions 11 to project in a circumferential direction.

Each of the insulating bobbins partially covers each of the tooth portions 11, around which the copper wire is wound, and each of the shoe portions 12, and is constructed by two parts, that is, a first insulating bobbin portion and a second insulating bobbin portion.

Figure 4:
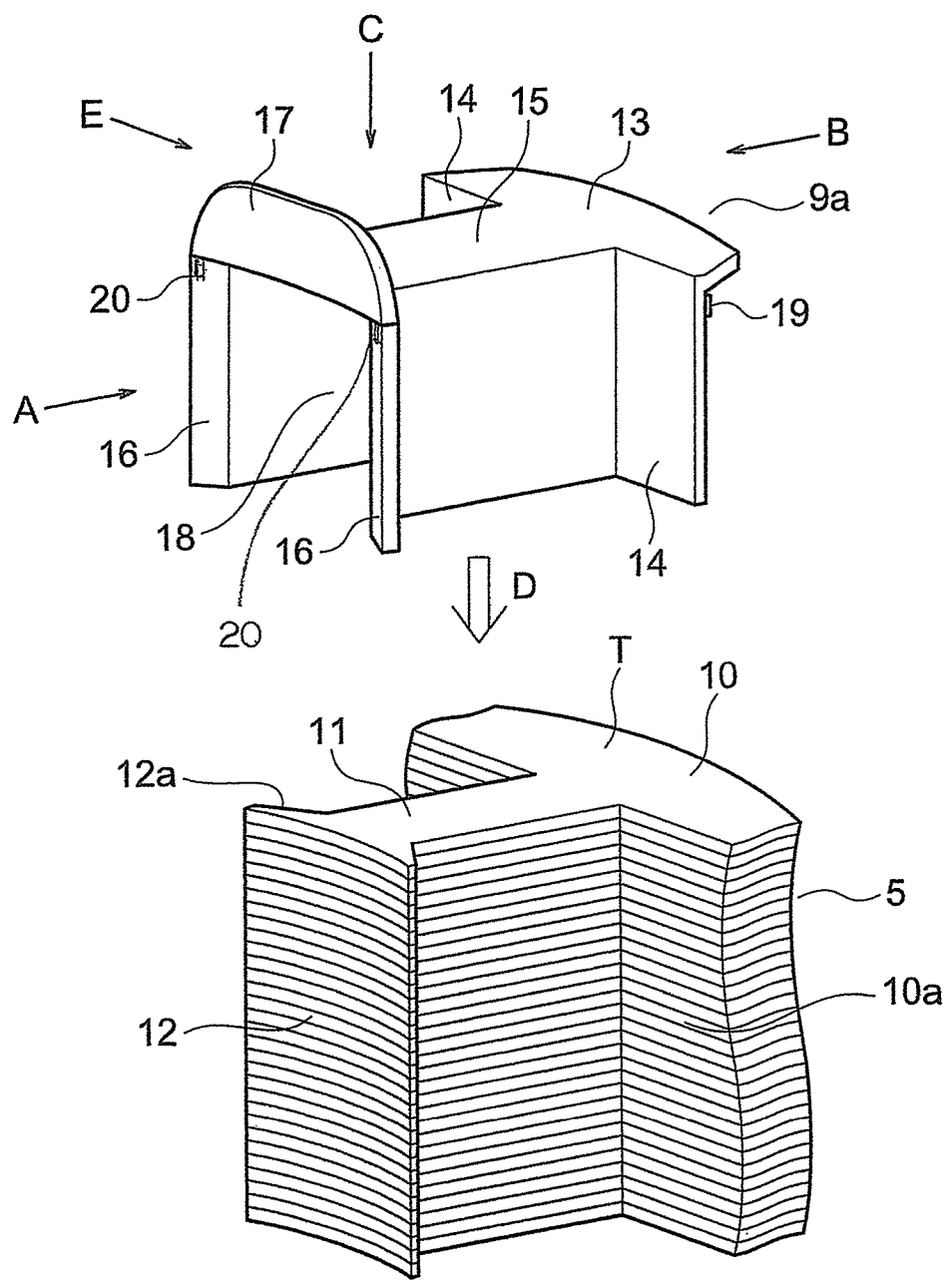
FIG. 4 is a perspective view illustrating a first insulating bobbin portion to be inserted onto the stator core illustrated in FIG. 1.
Figure 5:
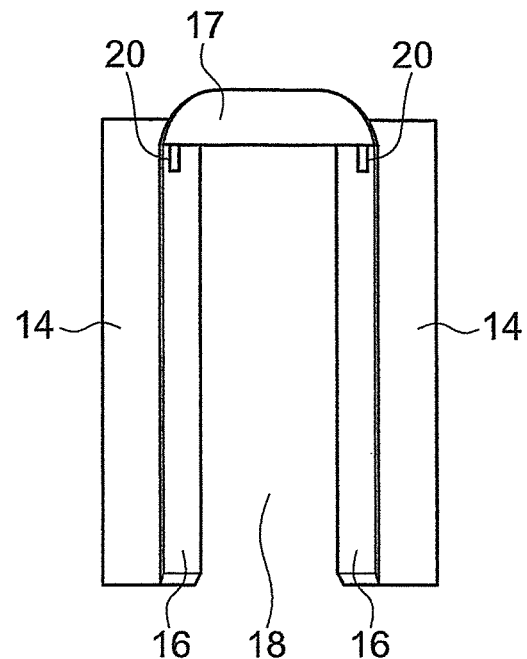
FIG. 5 is a view illustrating the first insulating bobbin portion illustrated in FIG. 4 as viewed along the arrow A.
Figure 6:
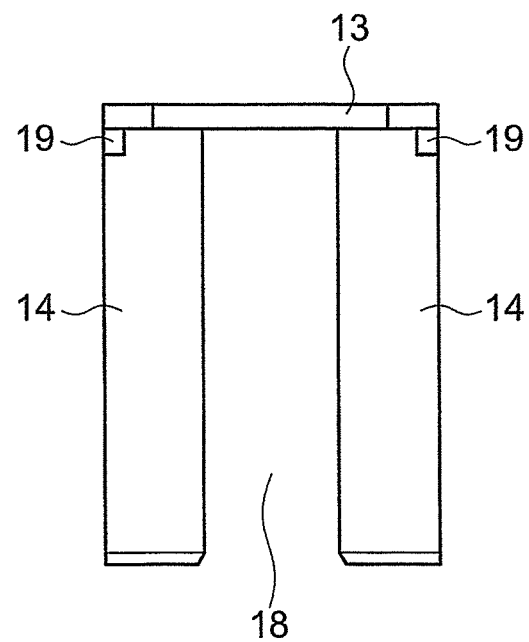
FIG. 6 is a view illustrating the first insulating bobbin portion illustrated in FIG. 4 as viewed along the arrow B.
Figure 7:
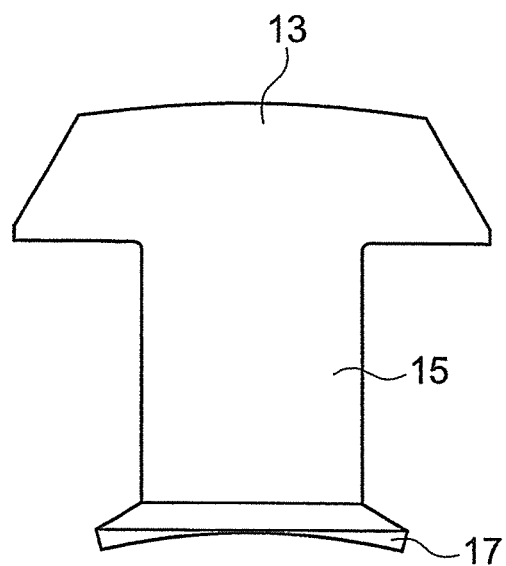
FIG. 7 is a view illustrating the first insulating bobbin portion illustrated in FIG. 4 as viewed along the arrow C.

FIG. 4 is a perspective view illustrating a first insulating bobbin portion 9a to be inserted onto the stator core 5 illustrated in FIG. 1, FIG. 5 is a view illustrating the first insulating bobbin portion 9a illustrated in FIG. 4 as viewed along the arrow A, FIG. 6 is a view illustrating the first insulating bobbin portion 9a illustrated in FIG. 4 as viewed along the arrow B, and FIG. 7 is a view illustrating the first insulating bobbin portion 9a illustrated in FIG. 4 as viewed along the arrow C.

FIG. 4 illustrates a state in which the first insulating bobbin portion 9a is inserted onto one end surface T of the stator core 5 in the axial direction along a direction indicated by the arrow D. The second insulating bobbin portion is inserted onto another end surface of the stator core 5 in the axial direction along a direction opposite to the arrow D.

The first insulating bobbin portion 9a includes, as illustrated in FIG. 4, a back-yoke engagement portion 13 having an L-like sectional shape, to be brought into engagement with the back yoke portion 10 of the stator core 5, a shoe engagement portion 17 to be brought into engagement with the shoe portion 12 of the stator core 5, and a coil winding portion 15 having a U-like sectional shape, around which the copper wire is wound, which are formed integrally. Each of the tooth portions 11 is inserted into an opening portion 18 inside the coil winding portion 15.

The back-yoke engagement portion 13 includes convex portions 19 for the back yoke portion, which are formed integrally on outer-diameter surfaces of a pair of back yoke-side coil retaining pieces 14. The outer-diameter surfaces are opposed to inner-diameter surfaces 10a of the back yoke portion 10.

The shoe engagement portion 17 includes convex portions 20 for the shoe portion, which are formed integrally on inner-diameter surfaces of a pair of shoe-side coil retaining pieces 16. The inner-diameter surfaces are opposed to outer-diameter surfaces 12a of the shoe portion 12.

The convex portions 19 for the back yoke portion and the convex portions 20 for the shoe portion are formed at positions symmetric with respect to a center line of each of the tooth portions 11. Each of the convex portions 19 for the back yoke portion and the convex portions 20 for the shoe portion are formed at positions to which distances in the circumferential direction from the center line of each of the tooth portions are different from each other.

Moreover, a distance from the end surface T of the stator core 5 to each of the convex portions 19 for the back yoke portion along the axial direction and that to each of the convex portions 20 for the shoe portion are the same. In addition, the convex portions 19 for the back yoke portion and the convex portions 20 for the shoe portion are formed on the side of the end surface T of the stator core 5.

A configuration of the second insulating bobbin portion is the same as that of the first insulating bobbin portion 9a, and the description thereof is herein omitted.

Figure 8:
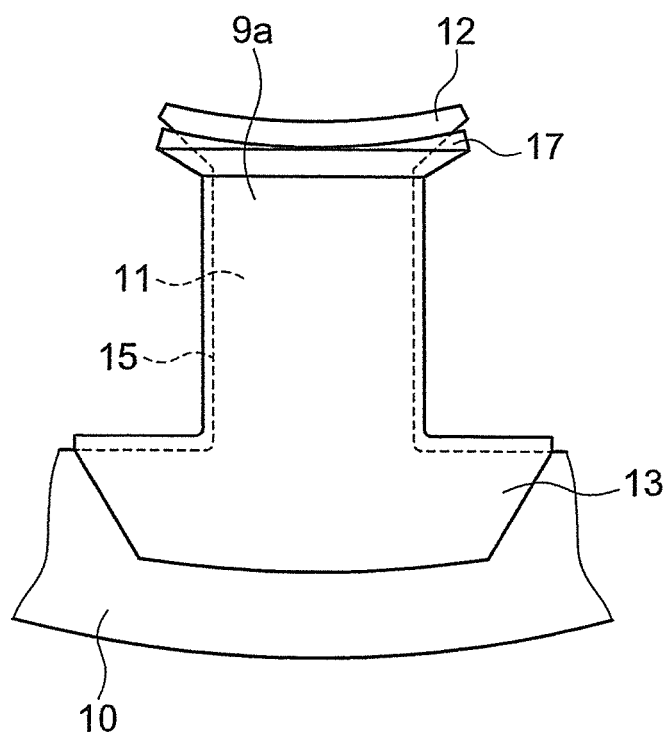
FIG. 8 is a plan view of a principal part when the first insulating bobbin portion is inserted onto the stator core.

FIG. 8 is a plan view of a principal part when the first insulating bobbin portion 9a is inserted onto the stator core 5.

Figure 9:
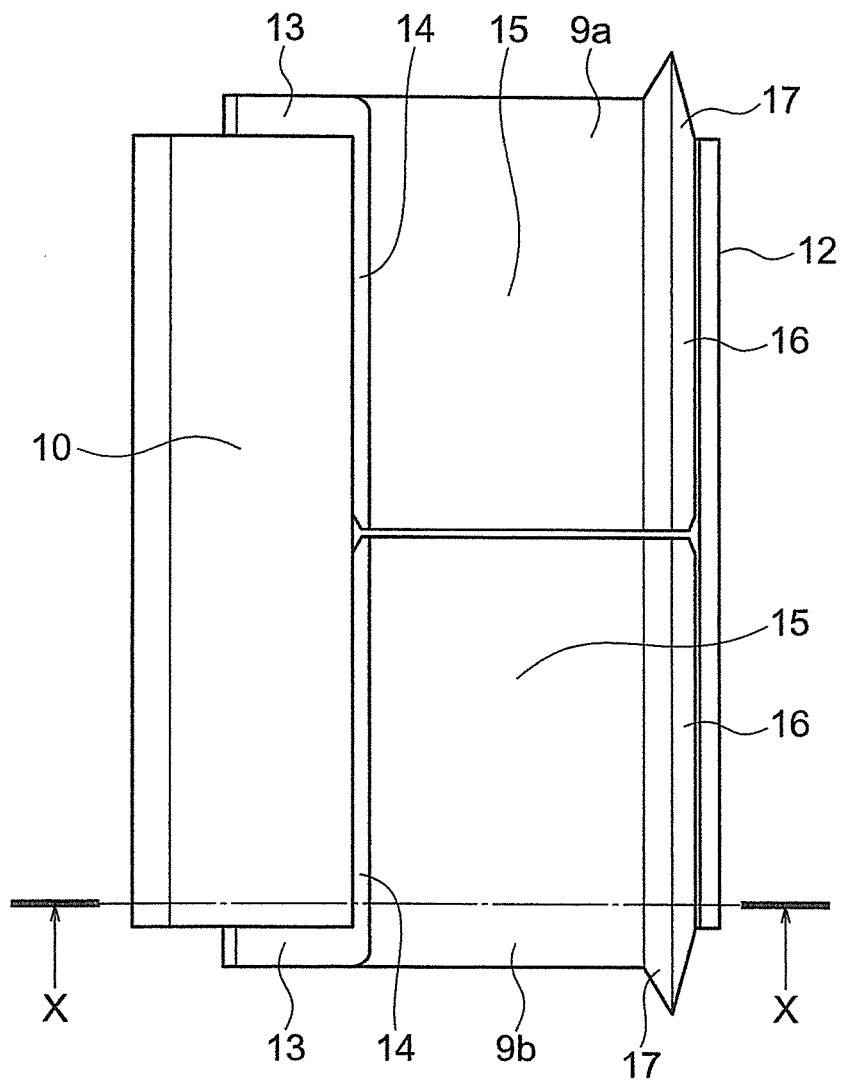
FIG. 9 is a view when the first insulating bobbin portion is mounted to the tooth portion and the shoe portion along a direction indicated by the arrow D in FIG. 4 and the second insulating bobbin portion is mounted to the tooth portion and the shoe portion along a direction opposite to the direction indicated by the arrow D, as viewed along the arrow E in FIG. 4.

FIG. 9 is a view when the first insulating bobbin portion 9a is mounted to the tooth portion 11 and the shoe portion 12 along a direction indicated by the arrow D in FIG. 4 and the second insulating bobbin portion 9a is mounted to the tooth portion 11 and the shoe portion 12 along a direction opposite to the direction indicated by the arrow D, as viewed along the arrow E in FIG. 4.

Figure 10:
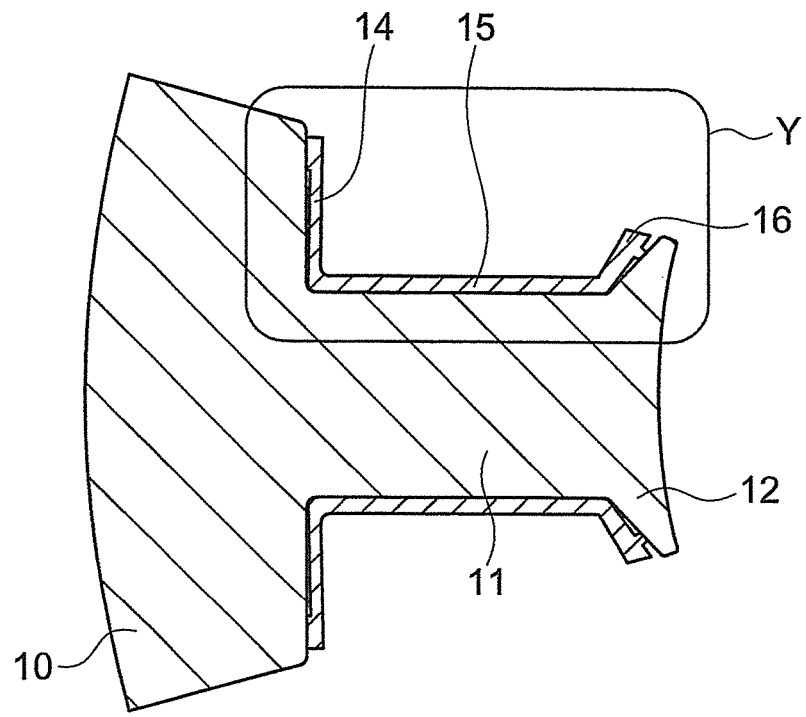
FIG. 10 is a sectional view taken along the line X-X in FIG. 9 as viewed from a direction of the arrows
Figure 11:
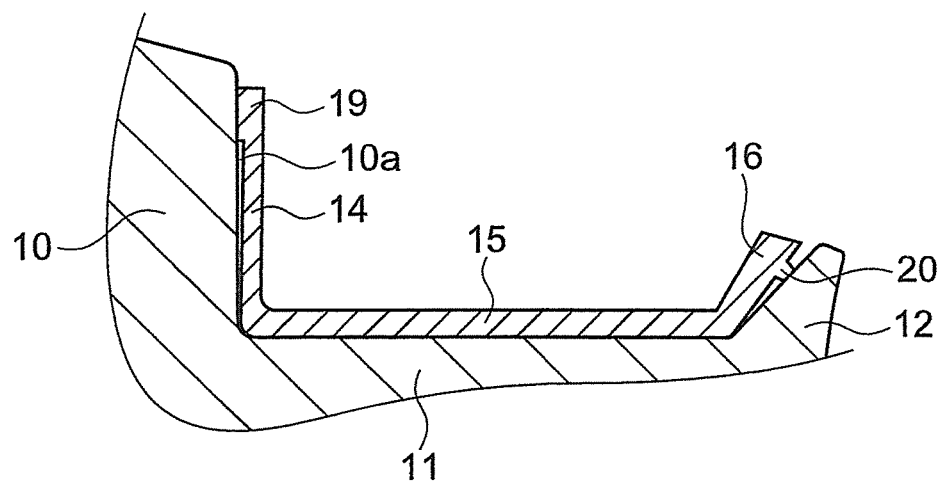
FIG. 11 is an enlarged view of an area Y in FIG. 10.

Moreover, FIG. 10 is a sectional view taken along the line X-X in FIG. 9 as viewed from a direction of the arrows, and FIG. 11 is an enlarged view of an area Y in FIG. 10.

According to the electrical motor 1 of this embodiment, in each of the first insulating bobbin portion 9a and the second insulating bobbin portion 9b, the convex portions 19 for the back yoke portion are respectively formed on the back yoke-side coil retaining pieces 14. Therefore, the convex portions 19 for the back yoke portion come into contact with the inner-diameter surfaces 10a of the back yoke portion 10. As a result, the convex portions 19 for the back yoke portion displace in a direction toward the shoe portion 12.

Moreover, the convex portions 20 for the shoe portion are formed respectively on the shoe-side coil retaining pieces 16. Therefore, the convex portions 20 for the shoe portion come into contact with the outer-diameter surfaces 12a of the shoe portion 12. As a result, the convex portions 20 for the shoe portion displace in a direction toward the back yoke portion 10.

Therefore, a force for biasing the back yoke-side coil retaining pieces 14 and the shoe-side coil retaining pieces 16 toward the stator core is exerted on the first insulating bobbin portion 9a and the second insulating bobbin portion 9b by the displacement of the convex portions 19 for the back yoke portion and the convex portions 20 for the shoe portion.

As described above, the first insulating bobbin portion 9a and the second insulating bobbin portion 9b are retained onto the stator core 5 by the pair of back yoke-side coil retaining pieces 14 for biasing toward the inner-diameter surfaces 10a of the back yoke portion 10 and the pair of shoe-side coil retaining pieces 16 for biasing toward the outer-diameter surfaces 12a of the shoe portion 12. As a result, during a delivery process to a step of mounting the coil 6, the coming-off of the coil under vibrations or its own weight can be reduced.

Moreover, the convex portions 19 for the back yoke portion and the convex portions 20 for the shoe portion are formed at symmetric positions with respect to the center line of each of the tooth portions 11. Therefore, the first insulating bobbin portion 9a and the second insulating bobbin portion 9b are evenly retained on both circumferential sides about the tooth portion 11 as a center.

As a result, normal postures of the first insulating bobbin portion 9a and the second insulating bobbin portion 9b are ensured for each of the tooth portions 11. Therefore, the insulating bobbin does not impair windability when the conductor wire is wound around the tooth portion 11.

Moreover, each of the convex portions 19 for the back yoke portion and each of the convex portions 20 for the shoe portion are formed at positions to which the circumferential distances from the center line of the tooth portion 11 are different. Moreover, the distance to each of the convex portions 19 for the back yoke portion and the distance to each of the convex portions 20 for the shoe portion from the end surface T of the stator core 5 along the axial direction are the same. Therefore, when or after the first insulating bobbin portion 9a and the second insulating bobbin portion 9b are inserted onto the stator core 5, a vector of the biasing force of the back yoke-side coil retaining pieces 14 against the inner-diameter surfaces 10a of the back yoke portion 10 and a vector of the biasing force of the shoe-side coil retaining pieces 16 against the outer-diameter surfaces 12a of the shoe portion 12 are on the same plane, but are not opposed to each other. Therefore, a resultant force of the biasing forces does not increase.

Thus, as for the first insulating bobbin portion 9a and the second insulating bobbin portion 9b, insertability is not degraded. Moreover, a retention force is appropriately ensured.

Moreover, the convex portions 19 for the back yoke portion and the convex portions 20 for the shoe portion are formed on the side of the end surface T of the stator core 5. Therefore, a structure of a molding die for each of the first insulating bobbin portion 9a and the second insulating bobbin portion 9b can be simplified. In addition, production efficiency of the first insulating bobbin portion 9a and the second insulating bobbin portion 9b can be improved.

In the embodiment described above, the convex portions 19 for the back yoke portion and the convex portions 20 for the shoe portion are provided at symmetric positions with respect to the center line of each of the tooth portions 11. However, the convex portions described above are not necessarily required to be provided at symmetric positions, or may also be provided on only one side.

Further, concave portions may be formed on the inner-diameter surfaces 10a of the back yoke portion 10, which are opposed to the convex portions 19 for the back yoke portion, whereas concave portions may be formed on the outer-diameter surfaces 12a of the shoe portion 12, which are opposed to the convex portions 20 for the shoe portion. In this manner, the insulating bobbin may be more reliably retained to the stator core.

In the embodiment described above, the electrical motor for the electrical power steering device has been described as the rotating electrical machine. However, the electrical motor for the electrical power steering device is an example, and other electrical machines may also be used. Moreover, the present invention is also applicable to power generators.

REFERENCE SIGNS LIST

1 electrical motor (rotating electrical machine), 2 stator, 3 rotor, 4 frame, 5 stator core, 6 coil, 8 shaft, 9a first insulating bobbin portion, 9b second insulating bobbin portion, 10 back yoke portion, 10a inner-diameter surface, 11 tooth portion, 12 shoe portion, 12a outer-diameter surface, 13 back yoke engagement portion, 14 back yoke-side coil retaining piece, 15 coil winding portion, 16 shoe-side coil retaining piece, 17 shoe engagement portion, 18 opening portion, 19 convex portion for back yoke portion, 20 convex portion for shoe portion, T end surface.

The invention claimed is:

1. A rotating electrical machine, comprising:
   a rotor rotatable about a shaft; and
   a stator provided so as to surround the rotor, the stator comprising a stator core and a coil mounted to the stator core by winding a conductor wire around the stator core through an insulating bobbin therebetween, the stator core comprising:
     a back yoke portion having a ring-like shape;
     a plurality of tooth portions provided at intervals in a circumferential direction so that distal end portions of the plurality of tooth portions project from the back yoke portion in an axial core direction; and
     shoe portions provided at the distal end portions of the plurality of tooth portions to project in the circumferential direction, wherein:
   the insulating bobbin comprises a first insulating bobbin portion and a second insulating bobbin portion inserted onto both end surfaces of the stator core in an axial direction, respectively;
   each of the first insulating bobbin portion and the second insulating bobbin portion comprises:
     a back yoke engagement portion having an L-like sectional shape, the back yoke engagement portion being configured to be brought into engagement with the back yoke portion;
     a shoe engagement portion to be brought into engagement with each of the shoe portions; and
     a coil winding portion having a U-like sectional shape, around which the conductor wire is to be wound, the coil winding portion having an opening portion on an inner side thereof, into which each of the plurality of tooth portions is to be inserted;
   the back yoke engagement portion comprises a convex portion for the back yoke portion, which is configured to be brought into contact with an inner-diameter surface of the back yoke portion, the convex portion protruding from at least one of outer-diameter surfaces of a pair of back yoke-side coil retaining pieces opposed to the inner-diameter surface of the back yoke portion;

the shoe engagement portion comprises a convex portion for the each of the shoe portions, which is configured to be brought into contact with an outer-diameter surface of the each of the shoe portions, the convex portion protruding from at least one of inner-diameter surfaces of a pair of shoe-side coil retaining pieces opposed to the outer-diameter surface of the each of the shoe portions; and the pair of back yoke-side coil retaining pieces and the pair of shoe-side coil retaining pieces are respectively biased away from the inner-diameter surface of the back yoke portion and the outer-diameter surface of the each of the shoe portions by the convex portion for the back yoke portion and the convex portion for the each of the shoe portions.

2. A rotating electrical machine according to claim 1, wherein the convex portions for the back yoke portion and the convex portions for the each of the shoe portions are respectively formed on both sides in a horizontal direction with respect to a center line of the each of the plurality of tooth portions.

3. A rotating electrical machine according to claim 1, wherein the convex portion for the back yoke portion and the convex portion for the each of the shoe portions are formed at positions to which distances in the circumferential direction from a center line of the each of the plurality of tooth portions are different.

4. A rotating electrical machine according to claim 1, wherein a distance to the convex portion for the back yoke portion and a distance to the convex portion for the each of the shoe portions from the end surface of the stator core along the axial direction are the same.

5. A rotating electrical machine according to claim 1, wherein the convex portion for the back yoke portion and the convex portion for the each of the shoe portions are formed on the end surface side of the stator core.

6. A rotating electrical machine according to claim 1, wherein the rotating electrical machine comprises an electrical machine for an electrical power steering device.

7. A rotating electrical machine, comprising:
a rotor rotatable about a shaft; and
a stator provided so as to surround the rotor, the stator comprising a stator core and a coil mounted to the stator core by winding a conductor wire around the stator core through an insulating bobbin therebetween, the stator core comprising:
a back yoke portion having a ring-like shape;
a plurality of tooth portions provided at intervals in a circumferential direction so that distal end portions of the plurality of tooth portions project from the back yoke portion in an axial core direction; and
shoe portions provided at the distal end portions of the plurality of tooth portions to project in the circumferential direction, wherein:
the insulating bobbin comprises a first insulating bobbin portion and a second insulating bobbin portion inserted onto both end surfaces of the stator core in an axial direction, respectively;
each of the first insulating bobbin portion and the second insulating bobbin portion comprises:
a back yoke engagement portion having an L-like sectional shape, the back yoke engagement portion being configured to be brought into engagement with the back yoke portion;
a shoe engagement portion to be brought into engagement with each of the shoe portions; and
a coil winding portion having a U-like sectional shape, around which the conductor wire is to be wound, the coil winding portion having an opening portion on an inner side thereof, into which each of the plurality of tooth portions is to be inserted;

the back yoke engagement portion comprises a convex portion for the back yoke portion, which is configured to be brought into contact with an inner-diameter surface of the back yoke portion, the convex portion being formed on at least one of outer-diameter surfaces of a pair of back yoke-side coil retaining pieces opposed to the inner-diameter surface of the back yoke portion;

the shoe engagement portion comprises a convex portion for the each of the shoe portions, which is configured to be brought into contact with an outer-diameter surface of the each of the shoe portions, the convex portion being formed on at least one of inner-diameter surfaces of a pair of shoe-side coil retaining pieces opposed to the outer-diameter surface of the each of the shoe portions;

the pair of back yoke-side coil retaining pieces and the pair of shoe-side coil retaining pieces are respectively biased away from the inner-diameter surface of the back yoke portion and the outer-diameter surface of the each of the shoe portions by the convex portion for the back yoke portion and the convex portion for the each of the shoe portions; and the convex portions for the back yoke portion and the convex portions for the each of the shoe portions are respectively formed on both sides in a horizontal direction with respect to a center line of the each of the plurality of tooth portions.

8. A rotating electrical machine, comprising:
a rotor rotatable about a shaft; and
a stator provided so as to surround the rotor, the stator comprising a stator core and a coil mounted to the stator core by winding a conductor wire around the stator core through an insulating bobbin therebetween, the stator core comprising:
a back yoke portion having a ring-like shape;
a plurality of tooth portions provided at intervals in a circumferential direction so that distal end portions of the plurality of tooth portions project from the back yoke portion in an axial core direction; and
shoe portions provided at the distal end portions of the plurality of tooth portions to project in the circumferential direction, wherein:
the insulating bobbin comprises a first insulating bobbin portion and a second insulating bobbin portion inserted onto both end surfaces of the stator core in an axial direction, respectively;
each of the first insulating bobbin portion and the second insulating bobbin portion comprises:
a back yoke engagement portion having an L-like sectional shape, the back yoke engagement portion being configured to be brought into engagement with the back yoke portion;
a shoe engagement portion to be brought into engagement with each of the shoe portions; and
a coil winding portion having a U-like sectional shape, around which the conductor wire is to be wound, the coil winding portion having an opening portion on an inner side thereof, into which each of the plurality of tooth portions is to be inserted;

the back yoke engagement portion comprises a convex portion for the back yoke portion, which is configured to be brought into contact with an inner-diameter surface of the back yoke portion, the convex portion being formed on at least one of outer-diameter surfaces of a pair of back yoke-side coil retaining pieces opposed to the inner-diameter surface of the back yoke portion;

the shoe engagement portion comprises a convex portion for the each of the shoe portions, which is configured to be brought into contact with an outer-diameter surface of the each of the shoe portions, the convex portion being formed on at least one of inner-diameter surfaces of a pair of shoe-side coil retaining pieces opposed to the outer-diameter surface of the each of the shoe portions;

the pair of back yoke-side coil retaining pieces and the pair of shoe-side coil retaining pieces are respectively biased away from the inner-diameter surface of the back yoke portion and the outer-diameter surface of the each of the shoe portions by the convex portion for the back yoke portion and the convex portion for the each of the shoe portions; and the convex portion for the back yoke portion and the convex portion for the each of the shoe portions are formed at positions to which distances in the circumferential direction from a center line of the each of the plurality of tooth portions are different.

\* \* \* \* \*